United States Patent
Kwon et al.

(10) Patent No.: US 12,111,680 B2
(45) Date of Patent: Oct. 8, 2024

(54) MEMORY DEVICE INCLUDING RECEIVING CIRCUIT, ELECTRONIC DEVICE, AND RECEIVED SIGNAL PROCESSING METHOD OF ELECTRONIC DEVICE

(71) Applicant: SAMSUNG ELECTRONICS CO., LTD., Suwon-si (KR)

(72) Inventors: Dae Hyun Kwon, Seoul (KR); Min-Hyeong Kim, Osan-si (KR); Wang Soo Kim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 264 days.

(21) Appl. No.: 17/871,374

(22) Filed: Jul. 22, 2022

(65) Prior Publication Data

US 2023/0140969 A1 May 11, 2023

(30) Foreign Application Priority Data

Nov. 8, 2021 (KR) .................. 10-2021-0152427
Feb. 3, 2022 (KR) .................. 10-2022-0014340

(51) Int. Cl.
*G06F 1/08* (2006.01)
*H04L 25/03* (2006.01)

(52) U.S. Cl.
CPC .......... *G06F 1/08* (2013.01); *H04L 25/03057* (2013.01)

(58) Field of Classification Search
CPC ............. G06F 1/08; H04L 25/03057; H04L 25/03146; H04L 25/03267; H04L 25/05
See application file for complete search history.

(56) References Cited

U.S. PATENT DOCUMENTS

| | | | |
|---|---|---|---|
| 7,697,603 B1 | 4/2010 | Wang et al. | |
| 7,822,114 B2 | 10/2010 | Bulzacchelli et al. | |
| 8,457,190 B2 | 6/2013 | Raghavan et al. | |
| 8,831,084 B1 | 9/2014 | Liu et al. | |
| 9,231,793 B1 | 1/2016 | Vareljian et al. | |
| 9,531,570 B2 | 12/2016 | Hekmat et al. | |
| 10,666,470 B2 | 5/2020 | Taylor et al. | |
| 2005/0254569 A1* | 11/2005 | Momtaz | H04L 25/03057 375/232 |
| 2010/0238993 A1* | 9/2010 | Huang | H04L 7/0337 375/233 |

(Continued)

OTHER PUBLICATIONS

Sugita et al., ISSCC 2010/Session 8/High-Speed Wireline Transceivers/ 8.4, pp. 162-164 (2010).

*Primary Examiner* — Jaweed A Abbaszadeh
*Assistant Examiner* — Brian J Corcoran
(74) *Attorney, Agent, or Firm* — Muir Patent Law, PLLC

(57) ABSTRACT

A memory device including a receiving circuit is provided. The receiving circuit of the memory device includes a first path receiving a received signal and outputting the received signal directly as a first corrected signal in a current clock signal, a second path holding or tracking the received signal and outputting a second corrected signal in the current clock signal, wherein the second corrected signal is held in a previous clock signal, a summing circuit summing the first corrected signal and the second corrected signal and outputting a summed received signal, and a decision feedback equalizer comparing the summed received signal with a reference signal to decide equalized data and outputting the equalized data in the current clock signal.

20 Claims, 4 Drawing Sheets

(56) References Cited

U.S. PATENT DOCUMENTS

2012/0230385 A1* 9/2012 Currivan .......... H04L 25/03057
375/233
2018/0091189 A1* 3/2018 Chada ............... H04L 25/03878

* cited by examiner

MEMORY DEVICE INCLUDING RECEIVING CIRCUIT, ELECTRONIC DEVICE, AND RECEIVED SIGNAL PROCESSING METHOD OF ELECTRONIC DEVICE

CROSS-REFERENCE TO RELATED APPLICATIONS

This application claims priority from Korean Patent Application No. 10-2021-0152427 filed on Nov. 8, 2021, and Korean Patent Application No. 10-2022-0014340 filed on Feb. 3, 2022, in the Korean Intellectual Property Office, and all the benefits accruing therefrom under 35 U.S.C. 119, the contents of each of which in its entirety are herein incorporated by reference.

BACKGROUND

1. Field

Embodiments relate to a receiving circuit, an interface of a memory device, and an electronic device.

2. Description of the Related Art

In accordance with an increase in speeds of electronic devices and a decrease in power consumed in the electronic devices, memory devices embedded in the electronic devices have also been required to operate with fast read/write operations and low operation voltages. A random access memory (RAM) may be volatile or nonvolatile. The volatile random access memory (RAM) loses information stored therein whenever power is removed, whereas the nonvolatile random access memory (RAM) may retain memory contents thereof even when power is removed from the nonvolatile random access memory.

SUMMARY

An embodiment is directed to a memory device including a receiving circuit, wherein the receiving circuit of the memory device includes a first path receiving a received signal and outputting the received signal directly as a first corrected signal in a current clock signal, a second path holding or tracking the received signal and outputting a second corrected signal in the current clock signal, the second corrected signal is held in a previous clock signal, a summing circuit summing the first corrected signal and the second corrected signal and outputting a summed received signal and a decision feedback equalizer comparing the summed received signal with a reference signal to decide equalized data and outputting the equalized data in the current clock signal.

An embodiment is directed to a received signal processing method of an electronic device, including receiving a first received signal through a channel, holding the first received signal in a first clock signal, receiving a second received signal in a second clock signal, generating a summed received signal by subtracting the held first received signal from the second received signal, comparing the summed received signal with a reference signal and outputting a comparison result decided as a final received signal in the second clock signal.

An embodiment is directed to an electronic device including a receiver receiving a received signal with a clock signal through a channel, a current mode level (CML) latch holding the first received signal while the first clock signal is enabled, a summing circuit performing an operation on a second received signal and the held first received signal and outputting a summed received signal, when receiving the second received signal, and a decision feedback equalizer comparing the summed received signal with a reference signal and outputting equalized data in a second clock signal.

BRIEF DESCRIPTION OF THE DRAWINGS

Features will become apparent to those of skill in the art by describing in detail example embodiments with reference to the attached drawings in which.

DETAILED DESCRIPTION

Figure 1:
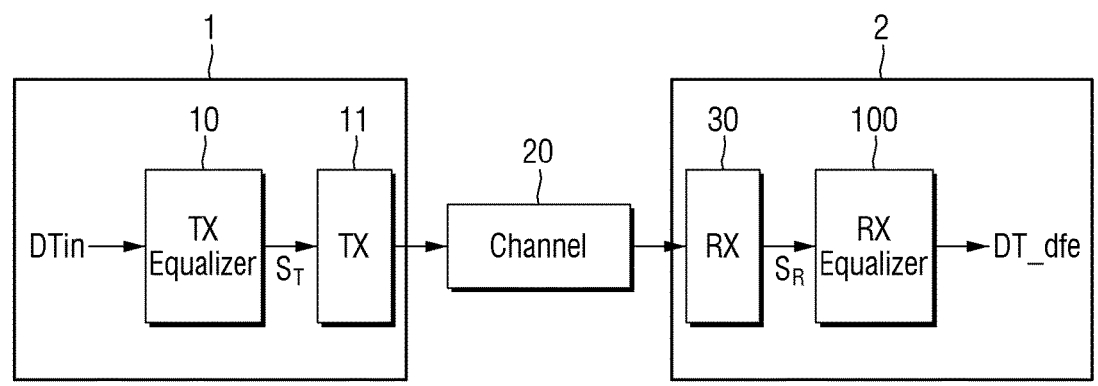
FIG. 1 is a block diagram illustrating a transmitting circuit and a receiving circuit according to some example embodiments.

Hereinafter, a memory device and an electronic device according to some example embodiments will be described with reference to FIGS. 1 to 8.

The terms "unit", "module", and the like, used herein or functional blocks illustrated in the drawings may be implemented in the form of a software component, a hardware component, or a combination thereof. Hereinafter, in order to clearly describe a technical spirit, a detailed description of overlapping components may be omitted.

Figure 2:
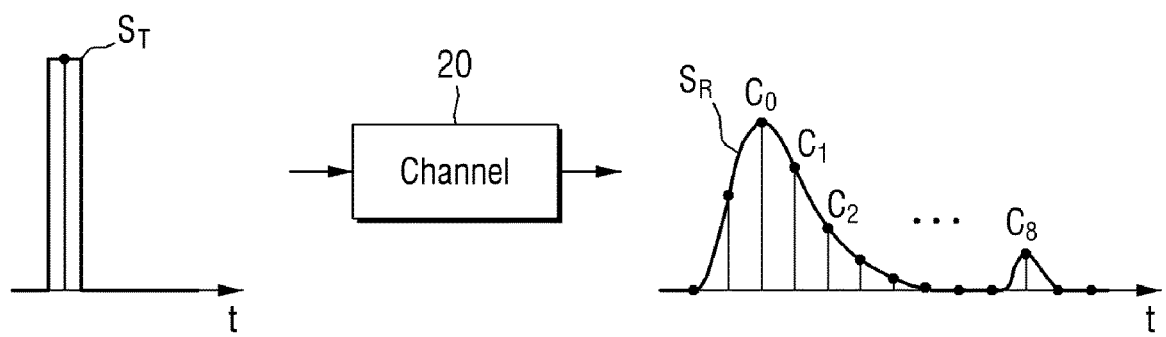
FIG. 2 is a conceptual diagram illustrating an input signal to a lost channel and an output signal from a non-ideal channel, illustrating influences of inter-symbol interference.

FIG. 1 is a block diagram illustrating a transmitting circuit and a receiving circuit according to some example embodiments, and FIG. 2 is a conceptual diagram illustrating an input signal to a lost channel and an output signal from a non-ideal channel, illustrating influences of inter-symbol interference.

For the purpose of briefness of the drawings, components unnecessary for describing the technical spirit of the present disclosure may be omitted. Hereinafter, for convenience of explanation, the terms "signal", "data", "symbol", and "bit" are used to indicate signals generated/transmitted/received between components. These terms are used in order to briefly describe an example embodiment of the present disclosure, and the respective terms will be organically combined with and understood together with functions of the respective components.

In addition, in order to clearly describe embodiments, it is assumed that a receiving equalizer 100 includes a decision feedback equalizer (DFE). However, the scope of the present disclosure is not limited thereto, and the receiving equalizer 100 may be implemented as one of various types of signal compensation circuits.

Referring to FIG. 1, a transmitting circuit 1 may include a transmitting equalizer 10 and a transmitting driver (TX)

11. The transmitting equalizer 10 may receive input data DTin, and may output an output signal $S_T$ based on the received input data DTin.

The receiving circuit 2 may include a receiving driver (RX) 30 and the receiving equalizer 100. The receiving driver 30 may receive the output signal $S_T$ transmitted from the transmitting circuit 1 through the channel 20, and may output a received signal $S_R$.

In an example embodiment, the output signal $S_T$ passes through a channel 20, and may thus be distorted due to a response characteristic or noise of the channel 20. That is, the receiving driver 30 may output the received signal $S_R$ distorted by the channel 20 and the noise. In other words, the received signal $S_R$ may be a signal generated by reflecting the response characteristic and the noise of the channel 20 in the output signal $S_T$.

In an example embodiment, when the transmitting equalizer 10 ideally operates, such that inter-symbol interference (ISI) is normally removed, and there is no noise of the channel (CH), even though there is no transmitting equalizer 10, initial input data DTin may be normally determined through the received signal $S_R$. However, due to various external factors, it may be difficult for the transmitting equalizer 10 to ideally operate, and noise may be introduced into the channel 20, and thus, the initial input data DTin may not be normally determined through the received signal $S_R$.

Specifically, referring to FIG. 2, in one example embodiment, the signal $S_T$ transmitted by the transmitting circuit is a single square pulse $S_T$, and after this pulse is transmitted through a non-ideal (e.g., lossy) channel, the received analog signal $S_R$ has a different shape than the transmitted signal. The received signal $S_R$ has a value of $C_0$ when an analog signal is sampled at the receiving circuit, and due to a defect characteristic of the non-ideal channel, an effect of the transmitted pulse $S_T$ persists for three or four unit intervals, such that residual signal values called residuals $C_1$, $C_2$, and the like, are taken. In a high-speed serial link, a series of pulses may be transmitted at a rate referred to as an aggregate data rate, and each pulse represents a logical high or a logical low (i.e., a binary number 1 or a binary number 0). Residual signals from earlier received pulses may cause inter-symbol interference when a current pulse is received because the residual signals are received simultaneously with the current pulse and are superimposed on the current pulse.

The receiving equalizer 100 may be used after a decision is made as to whether the pulse $S_T$ transmitted by the transmitting circuit was 0 or 1. Once this decision has been made, a shape of the received analog signal corresponding to the transmitted pulse $S_T$ is inferred, residuals at various sampling time delays are calculated, and the calculated residuals are subtracted from the subsequently received signal $S_R$, such that effects of inter-symbol interference are decreased in a corrected signal.

Figure 3:
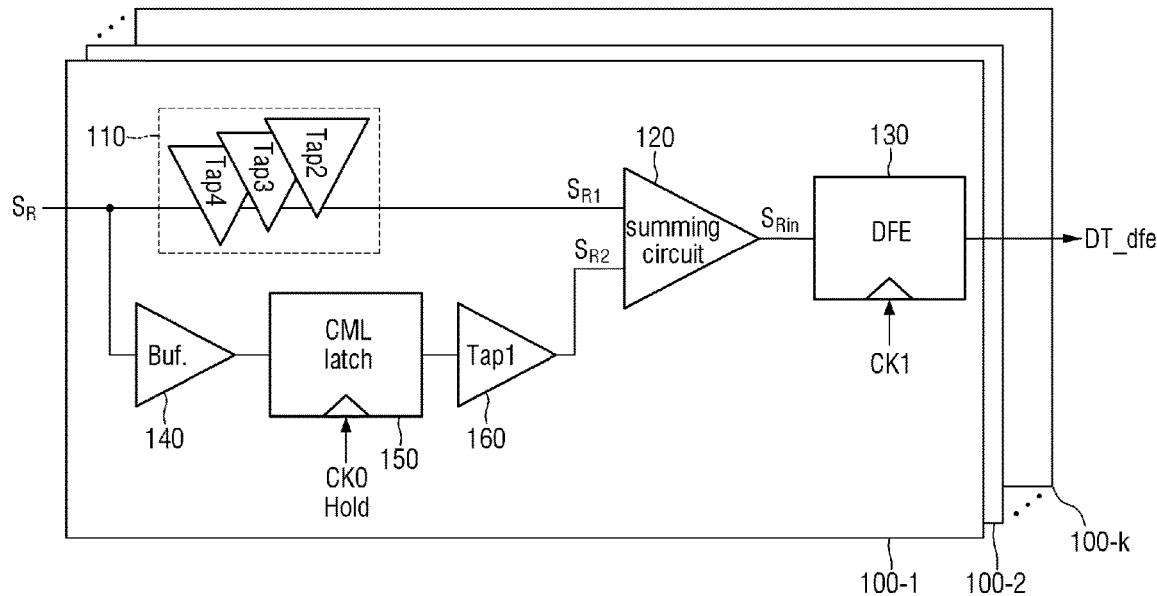
FIG. 3 is a block diagram illustrating a receiving equalizer according to some example embodiments.

FIG. 3 is a block diagram illustrating a receiving equalizer according to some example embodiments.

Referring to FIG. 3, the receiving equalizer 100 may output equalized data DT_dfe (hereinafter, the equalized data DT_dfe may be referred to as DFE data DT_dfe) based on the received signal $S_R$. The receiving equalizer 100 may reflect predetermined coefficients to a previous symbol, a current symbol, and a subsequent symbol in order to remove inter-symbol interference in the received signal $S_R$, and output the DFE data DT_dfe.

According to some example embodiments, the receiving equalizer 100 may output the DFE data DT_dfe by removing the inter-symbol interference. However, when noise due to an external factor is reflected in the received signal $S_R$, the receiving equalizer 100 may not compensate for signal distortion caused by the noise. In this case, the DFE data DT_dfe may have a different value from the initial input data DTin. In addition, when an error for specific data is generated in the receiving equalizer 100, the error generated by an operation of the receiving equalizer 100 may affect subsequent data, such that a continuous error may occur.

The receiving equalizer 100 may include a summing circuit 120, a decision feedback equalizer 130, a current mode logic (CML) latch 150, and a tap 160.

The summing circuit 120 may sum a first received signal $S_{R1}$ and a second received signal $S_{R2}$, and output a summed corrected signal $S_{Rin}$ from which inter-symbol interference is removed.

The first received signal $S_{R1}$ is directly input to the summing circuit 120. According to some example embodiments, the receiving equalizer 100 may further include a plurality of taps 110 in a first path. For example, the first received signal $S_{R1}$ may be a signal generated by reflecting a coefficient based on at least one of a plurality of taps (e.g., Tap2, Tap3, and Tap4) in the received signal $S_R$ input to the first path. The tap Tap1 or the plurality of taps Tap2, Tap3, and Tap4 may be variously set in order to effectively remove the inter-symbol interference.

The second received signal $S_{R2}$ may be a signal output after holding the received signal $S_R$ input to a second path according to a clock signal CK0. According to some example embodiments, the receiving equalizer 100 may include the CML latch 150 and the tap 160 in the second path.

The CML latch 150 may track an input when the clock signal CK0 is at a first logic level and hold the input when the clock signal CK0 is at a second logic level. The CML latch 150 has a direct current power path. Although not illustrated, the CML latch 150 may include transistors, resistors, inductors, and capacitors.

That is, the second path may track or hold the input received signal $S_R$ in an analog manner according to the clock signal CK0. The tap 160 may reflect a preset tap coefficient (a) in a latch output signal of the CML latch 150 to output the second corrected signal $S_{R2}$.

According to some example embodiments, the second path may further include a buffer 140 in front of the CML latch 150. The buffer 140 may delay the received signal $S_R$ according to a setting, and input the delayed received signal $S_R$ to the CML latch 150.

The summing circuit 120 may sum the first received signal $S_{R1}$ and the second received signal $S_{R2}$, and output the summed corrected signal $S_{Rin}$. The summed corrected signal $S_{Rin}$ may be a signal obtained by subtracting the second received signal $S_{R2}$ from the first received signal $S_{R1}$ in order to remove the inter-symbol interference. The first received signal $S_{R1}$ may be an analog signal to which the received signal $S_R$ input to the first path is directly connected the first path, and the second received signal $S_{R2}$ may be a digital signal digitized by the CML latch 150 in the second path. The summed corrected signal $S_{Rin}$ may become more robust against noise by subtracting the second received signal $S_{R2}$, which is the digital signal, from the first received signal $S_{R1}$, which is the analog signal.

The decision feedback equalizer 130 compares the summed corrected signal $S_{Rin}$ output from the summing circuit 120 with a preset reference voltage in a clock signal CK1 to decide an equalized data, such as the DFE data, and outputs the DFE data. The decision feedback equalizer 130 uses the summed received signal generated from the first received signal $S_{R1}$ generated based on the current clock signal CK1 and the second received signal $S_{R2}$ held in the previous clock signal CK0 without a feedback path between an output and an input of decision feedback equalizer 130, and may thus decrease a feedback time $V_{FB}$ due to the feedback path.

The clock signal CK1 of the decision feedback equalizer 130 may be a clock signal different from the clock signal CK0 of the CML latch 150. According to some example embodiments, two clock signals CK1 and CK0 may be signals having a same period and having a same duty ratio, but having different phases due to a phase shift. According to some example embodiments, assuming that the clock signal has four phases (Quadrant Phase Shift: 0, 90, 180, and 270), the clock signal CK0 and the clock signal CK1 may be clock signals having a difference of 90° therebetween. For example, [CK0, CK1]=[0, 90], [90, 180], [180, 270], or [270, 0]. According to some example embodiments, when the clock signal has eight phases, the clock signal CK0 and the clock signal CK1 may be clocks having a difference of 45° therebetween.

Figure 4:
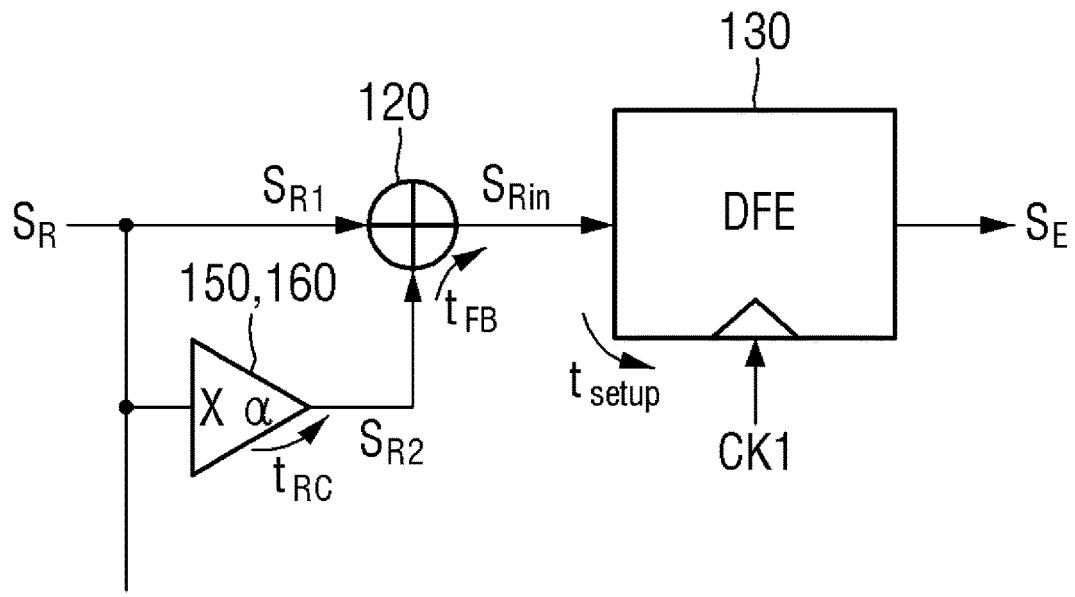
FIG. 4 is a diagram illustrating an example embodiment of the receiving equalizer illustrated in FIG. 3.

FIG. 4 is a diagram illustrating an example embodiment of the receiving equalizer illustrated in FIG. 3.

Referring to FIG. 4, the received signal $S_R$ is directly input to the summing circuit 120 through the first path. The received signal $S_R$ also passes through the CML latch 150 and the tap 160 in the second path to reflect the tap coefficient (a), and is input to the summing circuit 120. In this case, an RC time delay $t_{RC}$ is generated in the CML latch 150, and a feedback time delay $t_{FB}$ is generated when the received signal is input to the summing circuit 120.

The first corrected signal $S_{R1}$ of the first path and the second corrected signal $S_{R2}$ of the second path are based on the same clock signal CK0 without any phase difference. The summing circuit 120 inputs the summed received signal $S_{Rin}$ obtained by subtracting the second corrected signal $S_{R2}$ from the first corrected signal $S_{R1}$ to the decision feedback equalizer 130. In this case, when the decision feedback equalizer 130 receives the summed received signal $S_{Rin}$, a setup time delay $t_{setup}$ is generated. The decision feedback equalizer 130 compares the sum received signal $S_{Rin}$ with the reference signal according to the clock signal CK1 of the next phase to decide the DFE data DT_dfe, and outputs the DFE data DT_dfe.

When an operation time required from the input of the received signal $S_R$ to the output signal DT_dfe of the decision feedback equalizer 130 is regarded as one operation interval, if analog delays are calculated in the operation interval, a delay time obtained by summing the RC delay, the feedback time delay, and the setup time delay, which are the analog delays, is less than 1 unit interval (UI). 1 UI refers to the sum of the feedback time delay, the setup time delay, and a clock to Q delay.

Figure 5:
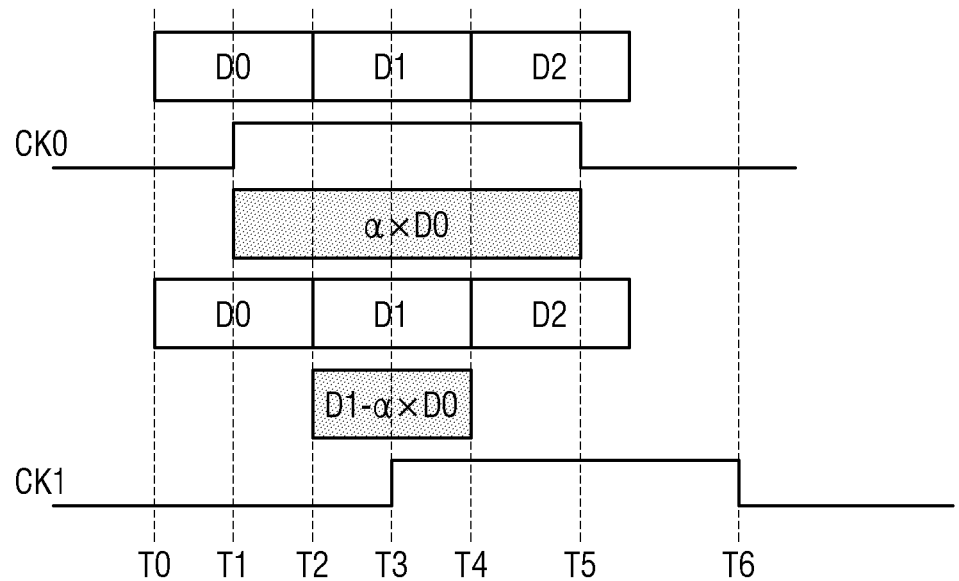
FIG. 5 is an operation timing diagram of the receiving equalizer according to some example embodiments.

FIG. 5 is an operation timing diagram of the receiving equalizer according to some example embodiments.

Referring to FIG. 5, it is assumed that the receiving equalizer 100 has four phase values with respect to a data rate according to some example embodiments. The four phase values have a difference of 90° therebetween. For example, it is assumed that the clock signal CK1 has a phase value delayed from a phase value of the clock signal CK0 by 90°.

Data D0, D1, and D2 are input from time T0. The data D0 received at time T0 is transferred to the summing circuit 120 in the first path, and the CML latch 150 of the second path holds the received data D0 at a rising edge (time T1) of the clock signal CK0 until a level of the clock signal CK0 changes again (for example, until a falling edge (time T5)).

The first path directly connected to the summing circuit 120 receives the data D1 from time T2 to time T4. When the next clock signal CK1 is input at time T3, that is, at a rising edge T3, the decision feedback equalizer 130 receives the summed received signal SRI input through the summing circuit 120, compares the summed received signal SRI with the reference signal to decide the DFE data DT_dfe, and outputs the DFE data DT_dfe.

In this case, the sum received signal SRI is a signal summed by the summing circuit 120 in an interval T3 to T4, and is a signal obtained by subtracting a signal αD0 obtained by multiplying the signal held in the second path by the tap coefficient (a) from the received signal D1 of the first path ($S_{Rin}$=D1−αD0).

When the receiving equalizer 100 operates as described above, the receiving equalizer 100 may delete a post cursor region generated in the previous clock signal from a data signal of the current clock signal through the CML latch 150 without a feedback delay time. In this case, the RC time delay of the CML latch 150 may be generated, but there is no clock to Q time according to the feedback, and thus, the receiving equalizer 100 may have a characteristic that may be robust against noise while operating faster.

Figure 6:
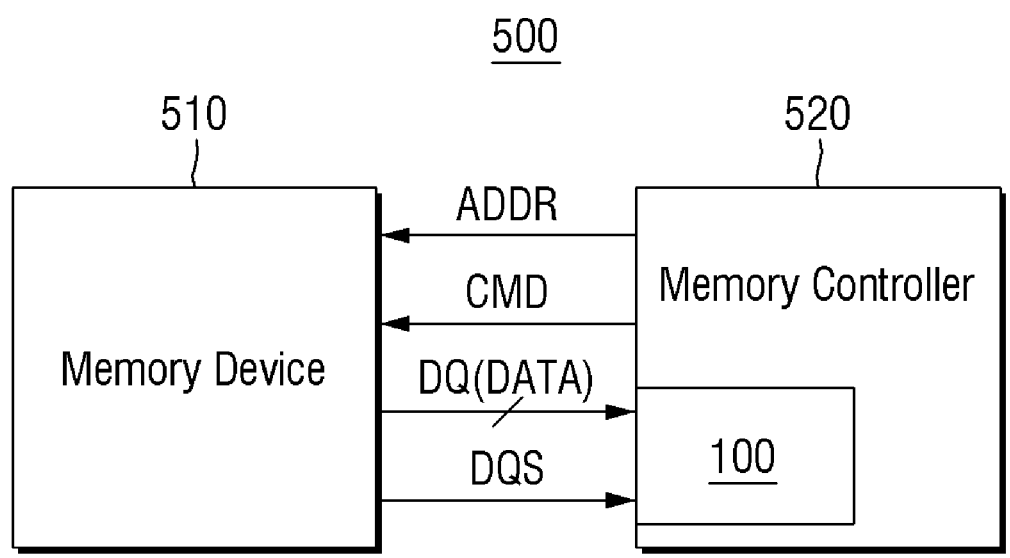
FIGS. 6 and 7 are block diagrams illustrating memory systems according to some example embodiments.
Figure 7:
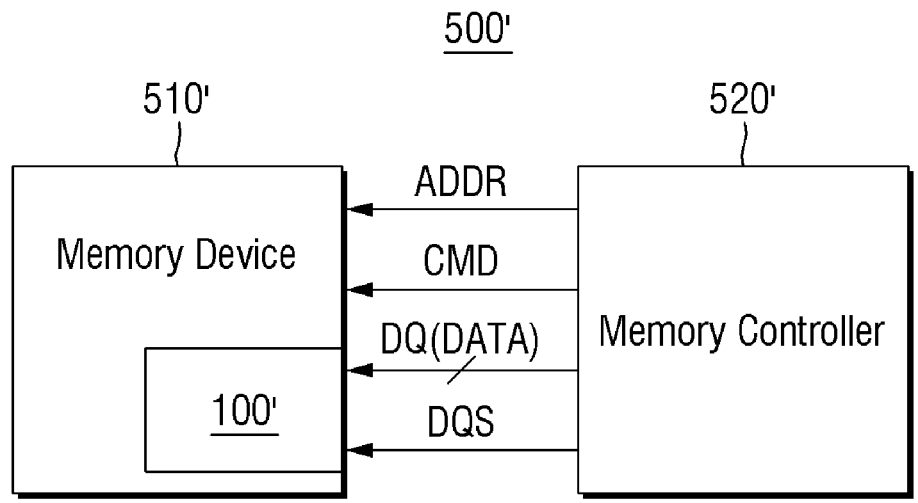

FIGS. 6 and 7 are block diagrams illustrating memory systems according to some example embodiments.

Referring to FIG. 6, a memory system 500 may include a memory device 510 and a memory controller 520. The memory device 510 may be a dynamic random access memory (DRAM), but the scope of the present disclosure is not limited thereto, and the memory device 510 may be a volatile memory device or a nonvolatile memory device.

The memory device 510 may store data DATA or transmit the stored data DATA to the memory controller 520 under the control of the memory controller 520. For example, the memory device 510 may transmit the data DATA to the memory controller 520 in response to a command CMD and an address ADDR from the memory controller 520. In this case, the memory controller 520 may provide the data DATA to the memory controller 520 in synchronization with a data strobe signal provided through a data strobe line DQS. For example, the data DATA may be transmitted and received between the memory device 510 and the memory controller 520 through a plurality of data lines DQ using the data strobe line DQS.

The memory controller 520 may receive the data DATA from the memory device 510 through the data lines DQ. For example, the memory controller 520 may identify the data DATA received through the data lines DQ based on the signal of the data strobe line DQS.

For example, the memory device 510 and the memory controller 520 may communicate with each other based on a double data rate (DDR) interface, but the scope of the present disclosure is not limited thereto, and the memory device 510 and the memory controller 520 may communicate with each other based on at least one of various interfaces such as a universal serial bus (USB), a multimedia card (MMC), a peripheral component interconnection (PCI), a PCI-express (PCI-E), an advanced technology attachment (ATA), a serial-ATA (SATA), a parallel-ATA (PATA), a small computer small interface (SCSI), an enhanced small disk interface (ESDI), an integrated drive electronics (IDE), a mobile industry processor interface (MIPI), a nonvolatile memory-express (NVM-e), or a NAND interface.

The memory controller 520 may include the receiving equalizer 100. The receiving equalizer 100 may be configured to adjust a pulse width corresponding to a current data bit based on the data received from the memory device 510. For example, the receiving equalizer 100 may remove noise of current data from previously received data. An operation method and a structure of the receiving equalizer 100 according to the present disclosure have been described in more detail with reference to FIGS. 1 to 5.

Referring to FIG. 7, a memory system 500' may include a memory device 510' and a memory controller 520'. Unlike an example embodiment of FIG. 6, in an example embodiment of FIG. 7, a receiving equalizer 100' may be included in the memory device 510', and may operate based on data received by the memory device 510'. Other components are similar to those of FIG. 6, and a detailed description thereof will thus be omitted.

As described above, the receiving equalizer 100 may more rapidly remove noise and inter-symbol interference of the current data signal in the current clock signal based on the previous data signal in the previous clock signal through the CML latch circuit. Accordingly, the memory controller 520 supporting a high-speed interface may normally receive data from the memory device 510, and reliability of the memory controller 520 may be improved.

Example embodiments may be described with reference to the receiving equalizer 100 (i.e., an example embodiment of FIG. 6) applied to the memory controller 520. The configurations of the memory device 510 and the memory controller 520 described above are configurations for describing an example embodiment, and the scope of the present disclosure is not limited thereto. For example, the receiving equalizer 100 according to the present disclosure may be applied to a signal transmitter, a signal receiver, or various electronic devices (e.g., a memory device) configured to transmit and receive various information through signal lines. In addition, the receiving equalizer 100 according to the present disclosure may be used to receive or transmit various signals as well as data signals through data lines.

Figure 8:
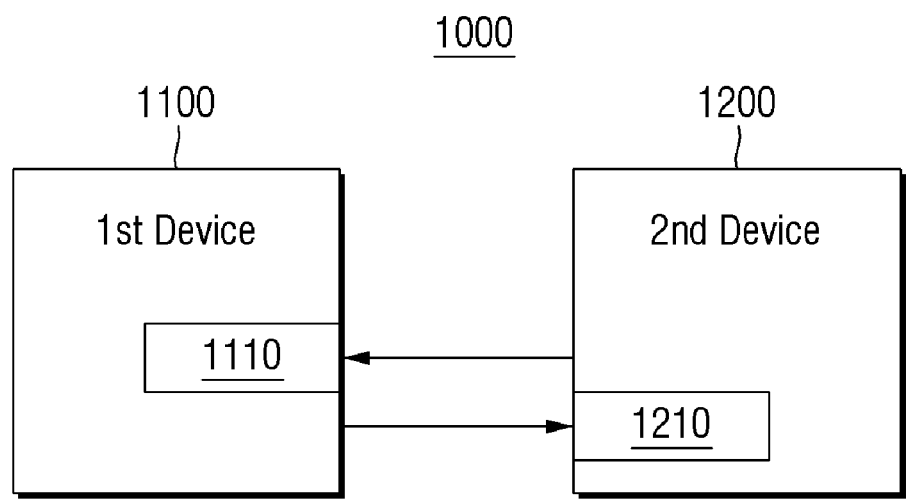
FIG. 8 is a block diagram illustrating electronic devices having a receiving circuit according to some example embodiments.

FIG. 8 is a block diagram illustrating electronic devices having a receiving circuit according to some example embodiments.

Referring to FIG. 8, a system 1000 may include first and second devices 1100 and 1200. Each of the first and second devices 1100 and 1200 may be a device transmitting and receiving information signals such as a data signal, an electrical signal, an analog signal, or a digital signal in the system 1000. For example, each of the first and second devices 1100 and 1200 may be an information processing device such as a signal transmitter, a signal receiver, an intellectual property (IP) block, an electronic module, or an electronic circuit.

The first and second devices 1100 and 1200 may include receiving circuits 1110 and 1210, respectively. Each of the receiving circuits 1110 and 1210 may include the receiving equalizer 100 described with reference to FIGS. 1 to 5. That is, the receiving circuits 1110 and 1210 may be configured to filter noise from signals received from the first and second devices 1100 and 1200 through the receiving equalizers.

By way of summation and review, a dynamic random access memory (DRAM) data transmission method includes a multi-drop channel method in which several chips are simultaneously connected to one signal line in order to increase a transmission data capacity and a single-ended method for decreasing the numbers of signal lines and pins. The multi-drop channel method is a method in which several DRAM chips are connected to one signal line. Parasitic resistance, parasitic inductance, and parasitic capacitance exist at input pins of the DRAM chips. Due to these parasitic components, in the multi-drop method, signal attenuation occurs, such that a channel frequency band is decreased. This may act as inter-signal interference (ISI) in high-frequency signal transmission to decrease a voltage margin and a time margin of a transmitted signal. In general, an equalizer is mainly used as a method for removing the ISI.

As described above, embodiments may provide a receiving circuit that may be robust against noise utilizing a digital signal, and a memory device including the same. Embodiments may provide a memory device including a receiving circuit that may be capable of faster operation by decreasing a feedback time while being robust against noise.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A memory device, comprising:
a receiving circuit, the receiving circuit including:
a first path receiving a received signal, and outputting the received signal directly as a first corrected signal in a current clock signal;
a second path holding or tracking the received signal, and outputting a second corrected signal in the current clock signal,
wherein the second corrected signal is held in a previous clock signal;
a summing circuit summing the first corrected signal and the second corrected signal, and outputting a summed received signal; and
a decision feedback equalizer comparing the summed received signal with a reference signal to decide equalized data, and outputting the equalized data in the current clock signal.

2. The memory device as claimed in claim 1, wherein the second path includes:
a current mode level (CML) latch receiving the current clock signal and the received signal as inputs, and outputting the second corrected signal; and
a tap reflecting a tap coefficient in an output signal of the CML latch.

3. The memory device as claimed in claim 2, wherein:
the first corrected signal is data received in the current clock signal, and
the second corrected signal is data received in the previous clock signal.

4. The memory device as claimed in claim 2, wherein the second path further includes a buffer delaying the received signal, and outputting the delayed received signal to the CML latch.

5. The memory device as claimed in claim 1, wherein the summing circuit subtracts the second corrected signal from the first corrected signal, and outputs the summed received signal.

6. The memory device as claimed in claim 1, wherein:
the first path includes a plurality of taps, and a tap coefficient of at least one of the plurality of taps is reflected in the first corrected signal.

7. A method, comprising:
receiving a first received signal through a channel;
holding the first received signal in a first clock signal;
receiving a second received signal in a second clock signal;
generating a summed received signal by subtracting the held first received signal from the second received signal; and
comparing the summed received signal with a reference signal, and outputting a comparison result decided as a final received signal in the second clock signal.

8. The method as claimed in claim 7, wherein the first clock signal and the second clock signal are signals having a same period and a same duty ratio, but having different phases.

9. The method as claimed in claim 8, wherein the second clock signal is a signal having a next phase of the first clock signal.

10. The method as claimed in claim 7, wherein the outputting of the comparison result decided as the final received signal is performed by a decision feedback equalizer operating based on the second clock signal.

11. The method as claimed in claim 9, wherein the holding of the first received signal is performed by a current mode level (CML) latch holding the first received signal while the first clock signal is enabled.

12. The method as claimed in claim 11, wherein the generating of the summed received signal includes reflecting a preset first tap coefficient to the held first received signal before subtracting the second received signal from the reflected first received signal.

13. The method as claimed in claim 12, wherein the generating of the summed received signal further includes reflecting at least one preset second tap coefficient among a plurality of tap coefficients to the second received signal before subtracting the held first received signal from the reflected second received signal.

14. The method as claimed in claim 11, wherein the first received signal input to the CML latch is inputted after being buffered for a preset time.

15. An electronic device, comprising:
a receiver receiving a received signal, and outputting a first received signal;
a current mode level (CML) latch holding the first received signal while a first clock signal is enabled;
a summing circuit performing an operation on a second received signal and the held first received signal, and outputting a summed received signal, when receiving the second received signal; and
a decision feedback equalizer comparing the summed received signal with a reference signal, and outputting equalized data in a second clock signal.

16. The electronic device as claimed in claim 15, wherein the CML latch reflects a preset first tap coefficient in the held first received signal, and outputs the first received signal in which the first tap coefficient is reflected to the summing circuit.

17. The electronic device as claimed in claim 16, wherein the first received signal is delayed by a preset buffer and input to the CML latch.

18. The electronic device as claimed in claim 15, wherein the first clock signal and the second clock signal are signals having a same period and a same duty ratio, but having different phases due to a phase shift.

19. The electronic device as claimed in claim 18, wherein the second clock signal is a signal having a next phase of the first clock signal.

20. The electronic device as claimed in claim 15, wherein:
a second tap coefficient of one of a plurality of taps is reflected in the second received signal, and
the second received signal, in which the second tap coefficient is reflected, is input to the summing circuit.

* * * * *